United States Patent
Tetaz et al.

(10) Patent No.: US 10,386,625 B2
(45) Date of Patent: Aug. 20, 2019

(54) KORSCH-TYPE COMPACT THREE-MIRROR ANASTIGMAT TELESCOPE

(71) Applicant: THALES, Courbevoie (FR)

(72) Inventors: Nicolas Tetaz, Cannes (FR); Thierry Viard, Mandelieu (FR)

(73) Assignee: THALES, Courbevoie (FR)

( * ) Notice: Subject to any disclaimer, the term of this patent is extended or adjusted under 35 U.S.C. 154(b) by 144 days.

(21) Appl. No.: 15/154,722

(22) Filed: May 13, 2016

(65) Prior Publication Data

US 2016/0341948 A1 Nov. 24, 2016

(30) Foreign Application Priority Data

May 22, 2015 (FR) .................... 15 01064

(51) Int. Cl.
*G02B 23/06* (2006.01)
*G02B 17/06* (2006.01)
*G02B 27/00* (2006.01)

(52) U.S. Cl.
CPC ......... *G02B 23/06* (2013.01); *G02B 17/0626* (2013.01); *G02B 17/0642* (2013.01); *G02B 27/0012* (2013.01)

(58) Field of Classification Search
CPC ............ G02B 23/06; G02B 17/0626; G02B 17/0642; G02B 27/0012; G02B 17/0631; G02B 17/0663; G02B 17/0694; G02B 7/0816; G02B 17/0832; G02B 17/0848; G02B 17/0896; G02B 17/0636

USPC ........................................ 359/366
See application file for complete search history.

(56) References Cited

U.S. PATENT DOCUMENTS

| | | | |
|---|---|---|---|
| 3,674,334 A | 7/1972 | Offner | |
| 8,616,712 B2 | 12/2013 | Rolland et al. | |
| 2005/0013021 A1* | 1/2005 | Takahashi | G02B 17/0642 359/837 |
| 2014/0124649 A1 | 5/2014 | Hou et al. | |
| 2014/0124657 A1 | 5/2014 | Zhu et al. | |

OTHER PUBLICATIONS

A new family of optical systems employing phi-polynomial surfaces; Kyle Fuerschbach, Jannick P. Rolland and Kevin P. Thompson, Oct. 24, 2011 / vol. 19, No. 22 / Optics Express 21919.*
G.W. Forbes, "Characterizing the shape of freeform optics," Optics Express 2483, vol. 20, No. 3, Jan. 30, 2012.

* cited by examiner

*Primary Examiner* — Stephone B Allen
*Assistant Examiner* — Rahman Abdur
(74) *Attorney, Agent, or Firm* — Baker & Hostetler LLP

(57) ABSTRACT

A three-mirror anastigmat telescope comprises at least a concave first mirror, a convex second mirror and a concave third mirror, the three mirrors arranged so that the first mirror and the second mirror form, from an object at infinity, an intermediate image situated between the second mirror and the third mirror, the third mirror forming, from this intermediate image, a final image in the focal plane of the telescope. In the architecture of the telescope, at least the surface of the concave third mirror is a $\varphi$-polynomial surface.

7 Claims, 4 Drawing Sheets

KORSCH-TYPE COMPACT THREE-MIRROR ANASTIGMAT TELESCOPE

CROSS-REFERENCE TO RELATED APPLICATION

This application claims priority to foreign French patent application No. FR 1501064, filed on May 22, 2015, the disclosure of which is incorporated by reference in its entirety.

FIELD OF THE INVENTION

The field of the invention is that of telescopes, and more particularly of observation telescopes embedded in satellites. More specifically, the field of the invention relates to the catoptric systems with great focal lengths.

BACKGROUND

There are two forms of angular field according to the type of receiver associated with the telescope. For the linear receivers, the angular field value is a few degrees in a first direction of space and a few tenths of degrees in the perpendicular direction. For the matrix receivers, the angular field value is a few degrees in both directions of space.

The optical architecture of this type of telescope comprises only conventionally off-axis mirrors. This type of architecture makes it possible to produce compact telescopes, having very good transmission and totally without chromatic aberrations. The image quality also has to be excellent in all the field. Consequently, the optical architecture has to be perfectly corrected of the geometrical aberrations that are spherical aberration, coma, field curvature and astigmatism.

A number of optical solutions have been proposed to produce such architectures.

A first type of optical architecture for anastigmat telescopes comprises three mirrors. These telescopes are also called "TMA telescopes", from the terminology "Three-Mirror Anastigmat". Conventionally, the mirrors of a TMA telescope are not inclined or "tilted". If the mirrors are all on a common optical axis, there is a significant central occulting. To eliminate the central occulting, either an "off-axis" field and/or "an off-axis" pupil is produced. In effect, the mirrors can be tilted to eliminate the central occulting, but this solution adds geometrical astigmatism and eccentricity coma aberrations which are not generally acceptable.

There are TMA telescopes in which the mirrors are slightly tilted and/or off-centre. Generally, the tilting of the mirror does not exceed one or two degrees. This optical solution makes it possible to reduce the field off-axis margin and/or pupil margin, but not totally eliminate them. An example of this type of three-mirror telescope is represented in FIG. 1. In this figure and the subsequent figures, the following conventions have been adopted. The figures are views in a cross-sectional plane. The mirrors are represented by bold lined circular arcs. The photosensitive detector D of the telescope is represented by a rectangle. Also represented are two light rays representative of the pupil edge rays for the central field. These light rays are represented by thin lines. In FIGS. 2 and 7, the intermediate planes are represented by dotted lines.

In the case of FIG. 1, the three mirrors are aspherical. The first mirror M1 is concave, the second mirror M2 is convex and the third mirror M3 is concave.

The TMA telescopes offer significant linear fields. Thus, the linear field can exceed 15 degrees. However, with given focal length, their bulk is sizeable and becomes prohibitive for certain applications, particularly when the pupil of the telescope has a significant diameter or when the focal length is significant.

There is also a second type of optical architecture that is more compact than the preceding architecture. These telescopes are called "Korsch". Their architecture represented in FIG. 2 is a variant of the preceding architecture. The Korsch telescopes are also a system with three aspherical mirrors M1, M2 and M3 of concave-convex-concave type, but the optical system has an intermediate focal plane $P_{FI}$ between the second mirror M2 and the third mirror M3. The mirror MR of FIG. 2 is a simple planar return mirror and is not involved in the optical system. Unfortunately, their field is limited. Thus, the linear field cannot readily exceed three degrees.

By way of example, a Korsch telescope with 10-metre focal length with f/4 aperture can have a linear field of 3°×0.5°. In this case, the root mean square error on the wavefront, or RMS WFE, the acronym for " Root Mean Square WaveFront Error" does not exceed $\lambda/20$ throughout the field of the telescope.

As has been stated, the mirrors used in the optical systems of the TMA or Korsch telescopes are aspherical mirrors. More specifically, their surface is defined by a conic and aspherical terms of revolution. Now, these surfaces are not perfectly adapted to correct the aberrations of optical systems which no longer have an axis of symmetry like the TMA or Korsch telescopes. The conventional TMAs have symmetry of revolution. However, they are not used on their optical axis, but in the field. The TMAs are perfectly corrected of the aberrations at the centre of the field, on the optical axis, but the occulting renders this point of the field inaccessible. The field of the telescope is therefore off-centre.

The more the distance from the optical centre increases, the more the image quality decreases because the system is not perfectly corrected of the aberrations. Thus, the RMS WFE of the preceding Korsch telescope changes to $\lambda/4$ when the linear field changes from 3°×0.5° to 6°×0.5°. This error is no longer compatible with the performance levels required. This is a first limitation.

Moreover, in a conventional Korsch, a hole has to be made in the first mirror in order to allow the light to pass as can be seen in FIG. 2. The first drawback associated with the presence of this opening is a reduction of the useful surface area of the primary mirror of the order of 15 to 20%. The second drawback is of a mechanical nature. For a field less than 3°, the hole dimension is acceptable, but if the field of view is increased, the size of the hole becomes significant and makes it necessary to produce the mirror M1 in two distinct parts, which poses significant mechanical problems. This point is illustrated in FIG. 3. On the left in this figure, a mirror M1 is represented with an aperture $T_{M1}$ that is sufficient to allow a field of 3 degrees by 0.5 degrees to pass. On the right in FIG. 3, a mirror is represented in two parts M1' and M1" separated by the aperture $T_{M1}$, the two parts being necessary to allow a field of 6 degrees by 0.5 degrees to pass. Finally, the aperture of the mirror necessarily degrades the modulation transfer function or FTM of the telescope as can be seen in FIG. 4 where there are represented on the one hand the real FTM of the telescope with its aperture and the theoretical FTM without aperture.

In recent years, a new type of optical surface has been developed. These surfaces are known as "freeform" surfaces. Generally, a freeform optic is a surface which has no symmetry of revolution.

There are various definitions of the freeform surfaces. Generally, each definition addresses a particular need, is adapted to a specific computation and optimization mode and, of course, to a specific embodiment.

By way of examples, the mathematical definitions of a freeform surface can be as follows:

Freeform surface defined by polynomials XY. In clear, this surface being defined in a space (x, y, z), if z(x, y) represents the coordinate z of a point of this surface, the following relationship applies:

$$z(x, y) = \frac{c(x^2 + y^2)}{1 + \sqrt{1 - (1+k)c^2(x^2 + y^2)}} + \sum A_i x^j y^k$$

C being the curvature of the surface, k being the conicity constant, $A_i$ being constants, i, j and k being indices varying respectively between 0 and three integer numbers.

This surface corresponds to an extension of the conventional definition of the aspherical surfaces by generalizing it to a surface without symmetry of revolution;

Freeform surface defined by phi-polynomials, for example the Zernike or Q-Forbes polynomials. The Zernike surfaces are the most commonly used. A Zernike surface is defined in polar coordinates in a space (ρ, φ, z), if z(ρ, φ) represents the coordinate z of a point of this surface, the following relationship applies:

$$z(\rho, \varphi) = \frac{c(\rho^2)}{1 + \sqrt{1 - (1+k)c^2\rho^2}} + \sum C_j Z_j$$

$Z_j$ being a j order Zernike polynomial and $C_j$ being the constant associated with this polynomial, j being an index varying respectively between 0 and an integer number.

The publication by G.W. Forbes entitled "Characterizing the shape of freeform optics" 30.01.2012/Vol.20, N° 3/Optics Express 2483 describes the surfaces defined by the Q-Forbes phi-polynomial surfaces.

Freeform surface defined by local equations of freeform surfaces of different definition.

Freeform surface defined by hybrid descriptions such as, for example, surfaces mixing phi-polynomial surfaces and so-called "NURBS" (Non-Uniform Rational Basis Splines) surfaces.

These freeform surfaces have been used to produce three-mirror telescopes. A first architecture of this type is represented in FIG. 5. The architecture is a triangular system with three mirrors, convex—concave—concave, of which at least two of the three mirrors are freeform surface mirrors. A description of this can be found in a number of publications including the patent U.S. Pat. No. 8,616,712 entitled "Non-symmetric optical system and design method for nonsymmetric optical system". This optical solution makes it possible to achieve significant fields but does not have the requisite compactness.

A second architecture of this type is represented in FIG. 6. The architecture is also a system with three mirrors, convex—concave—concave, of which at least one of the three mirrors is a freeform mirror. A description of this can be found in a number of publications including the patent application US 2014/0124649 entitled "Off-axial three-mirror system". This optical solution makes it possible to achieve significant fields but, hereagain, does not have the requisite compactness when the focal length is of significant size.

SUMMARY OF THE INVENTION

The telescope according to the invention also comprises one or more freeform mirrors so as to better correct the optical aberrations than the aspherical mirrors. This gain in quality is used so as to increase the field of the Korsch-type telescopes while retaining a reduced bulk. More specifically, the subject of the invention is a three-mirror anastigmat telescope comprising at least a concave first mirror, a convex second mirror and a concave third mirror, the three mirrors being arranged so that the first mirror and the second mirror form, from an object at infinity, an intermediate image situated between the second mirror and the third mirror, the third mirror forming, from this intermediate image, a final image in the focal plane of the telescope, characterized in that the surface of the concave third mirror is a φ-polynomial surface.

Advantageously, the surface of the concave first mirror is a φ-polynomial surface.

Advantageously, the surface of the convex second mirror is a φ-polynomial surface.

Advantageously, the pupil of the telescope is situated at the level of the concave first mirror.

Advantageously, the angular linear field is greater than 6 degrees in a direction of space.

Advantageously, the angular field is greater than 2.5 degrees in two perpendicular directions of space.

Advantageously, the normal at the centre of the surface of the concave first mirror is tilted by a few degrees on the optical axis of the telescope defined by the ray passing through the centre of the input pupil and perpendicular to this pupil, the normal at the centre of the surface of the convex second mirror is tilted by a few degrees on the optical axis of the telescope and the normal to the centre of the surface of the concave third mirror is tilted by a few degrees on the optical axis of the telescope.

Advantageously, the aperture of the telescope is between 7 and 25.

The invention relates also to a method for installing a three-mirror anastigmat telescope comprising a concave first mirror, a convex second mirror and a concave third mirror, the three mirrors being arranged so that the first mirror and the second mirror form, from an object at infinity, an intermediate image situated between the second mirror and the third mirror, the third mirror forming, from this intermediate image, a final image in the focal plane of the telescope, the method being implemented by optical system computation software, characterized in that the method comprises at least the following steps:

in a first step, determination of the paraxial parameters of the telescope;

in a second step, installation of the optical system of the telescope in a Korsch-type configuration comprising the three aspherical mirrors, determination of the main field aberrations by the nodal aberration theory and determination of the corresponding RMS WFE;

in a third step, addition, to the definition of the aspherical surface of one of the mirrors of the optical system, of the Zernike polynomial coefficients corresponding to the computed aberrations, said surface thus being a (p-polynomial freeform surface;

in a fourth step, elimination of the occluding of the primary mirror by a rotation of at least one of the mirrors and modification of the form of the mirror with freeform surface, so as to correct the aberrations created by the rotation of the mirror and modification of the Zernike polynomials so as to reduce the RMS WFE below a predetermined threshold.

Advantageously, the surface definition modifications made in the third step or in the fourth step also affect the surface of one of the other two mirrors of the telescope.

BRIEF DESCRIPTION OF THE DRAWINGS

The invention will be better understood and other advantages will become apparent on reading the following description, given in a nonlimiting manner and by virtue of the attached figures in which.

DETAILED DESCRIPTION

Figure 7:
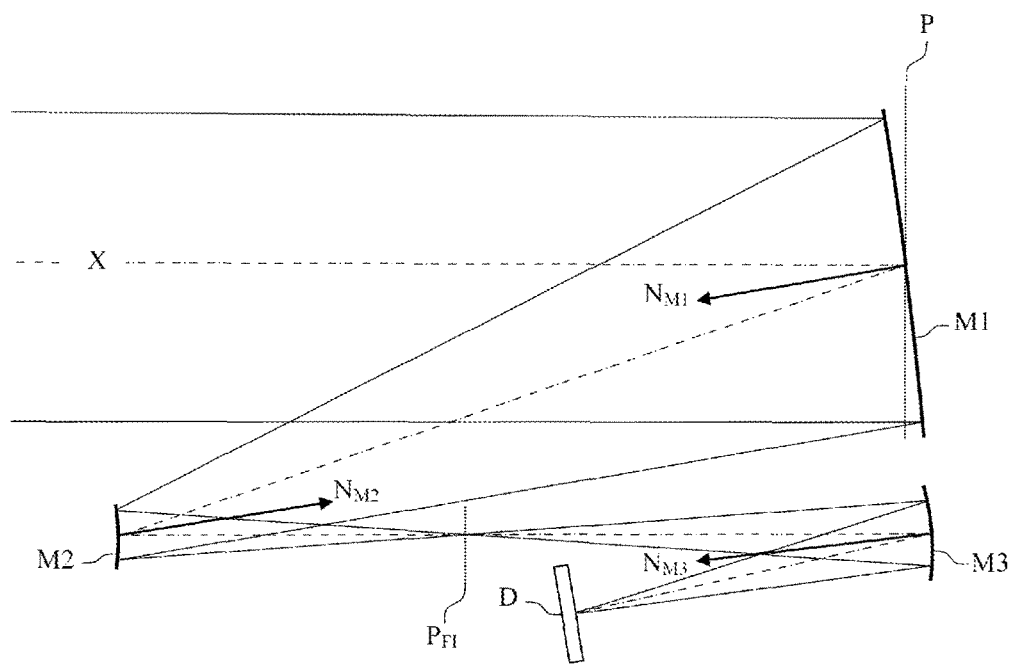
FIG. 7 represents an optical architecture of three-mirror anastigmat telescopes according to the invention.

By way of example, FIG. 7 represents an optical architecture of three-mirror anastigmat telescopes according to the invention. This architecture comprises a concave first mirror M1, a convex second mirror M2 and a concave third mirror M3. In this figure, the optical axis X passing through the centre of the pupil P is represented by dotted lines and the normals $N_{M1}$, $N_{M2}$ and $N_{M3}$ to the surface of the mirrors M1, M2 and M3 are represented by arrows arranged at the centre of the mirrors.

This architecture is derived from the Korsch-type architectures as described previously. However, it is demonstrated that the use of freeform surface mirrors makes it possible to notably increase the accessible anastigmat field. According to the architectures employed, the gain is substantially by a factor 2.

The three mirrors are arranged so that the first mirror and the second mirror form, from an object at infinity, an intermediate image situated in a focussing plane $P_{FI}$ situated between the second mirror and the third mirror. The third mirror forms, from this intermediate image, a final image in the focal plane of the telescope where the detector D is situated.

At least the surface of the concave third mirror is a φ-polynomial surface. The surfaces of the first and second mirrors can also be φ-polynomial.

The pupil P of the telescope is situated at the level of the concave first mirror M1.

As can be seen in FIG. 7, the normal $N_{M1}$ to the centre of the surface of the concave first mirror M1 is tilted by a few degrees on the optical axis X of the telescope defined by the ray passing through the centre of the input pupil and perpendicular to this pupil, the normal $N_{M2}$ to the centre of the surface of the convex second mirror M2 is tilted by a few degrees on the optical axis X of the telescope and the normal $N_{M3}$ to the centre of the surface of the concave third mirror M3 is tilted by a few degrees on the optical axis X of telescope.

This three-mirror configuration comprising an intermediate focal plane, a pupil situated at the level of the first mirror and mirrors with φ-polynomial surface weakly tilted on the axis makes it possible to obtain both a significant optical field, an open system and a bulk that is more reduced than the solutions of the prior art.

The method for computing the optical system of the telescope relies on the analysis of the aberrations expressed in the form of Zernike polynomials in the field. This analysis makes it possible to determine the values of the Zernike coefficients to be applied to the different mirrors M1, M2 and M3.

The method used rests on the nodal aberration theory, known as such and generalized to freeform surfaces. This method is described in "Theory of aberration fields for general optical systems with freeform surfaces" by K. Fuerschbach. It is installed by means of optical system computation software.

In a first step, the paraxial parameters of the telescope, that is to say its focal length, its aperture and its field, are determined.

In a second step, the optical system of the telescope is installed in a Korsch-type configuration with three simply aspherical mirrors. In this second step, no account is taken of any occultings due to the different mirrors. The main aberrations in the field are then determined by the nodal aberration theory, that is to say the astigmatism, coma and spherical aberrations, as well as the RMS WFE in the field of the Korsch with three aspherical mirrors.

In a third step, Zernike coefficients corresponding to the computed aberrations are added to at least the surface of one of the mirrors of the optical combination so as to reduce them and/or eliminate them in all the field of the telescope. The optical solution found remains theoretical because the light is partly blocked by the mirrors.

Figure 1:
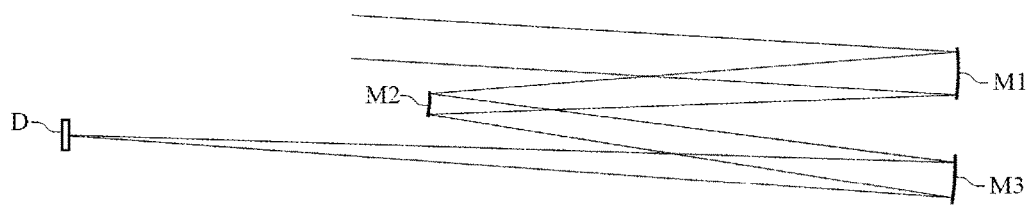
FIG. 1 represents a first optical architecture of three-mirror anastigmat telescopes called "TMA telescopes" according to the prior art.
Figure 2:
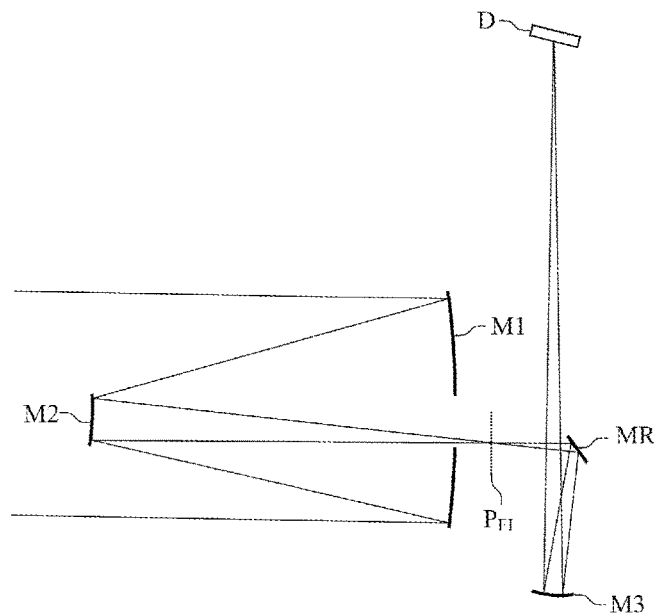
FIG. 2 represents a second optical architecture of three-mirror anastigmat telescopes called "Korsch telescopes" according to the prior art.
Figure 3:
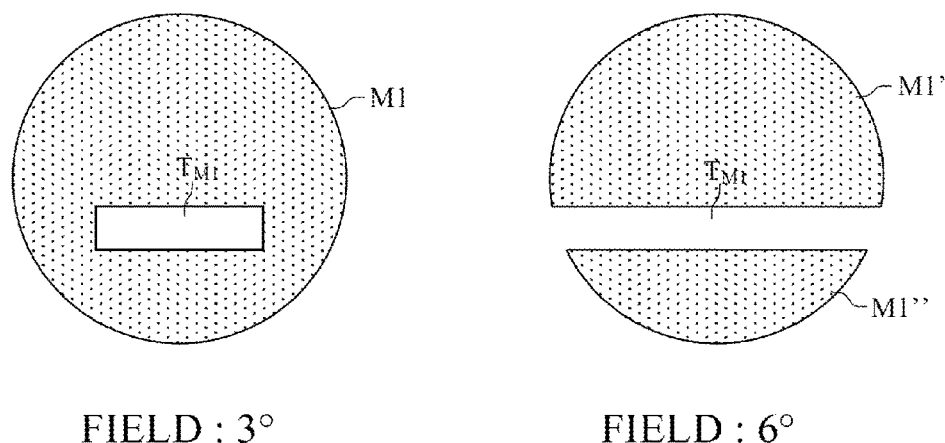
FIG. 3 represents a front view of a primary Korsch telescope mirror with its central aperture in two different field configurations.
Figure 4:
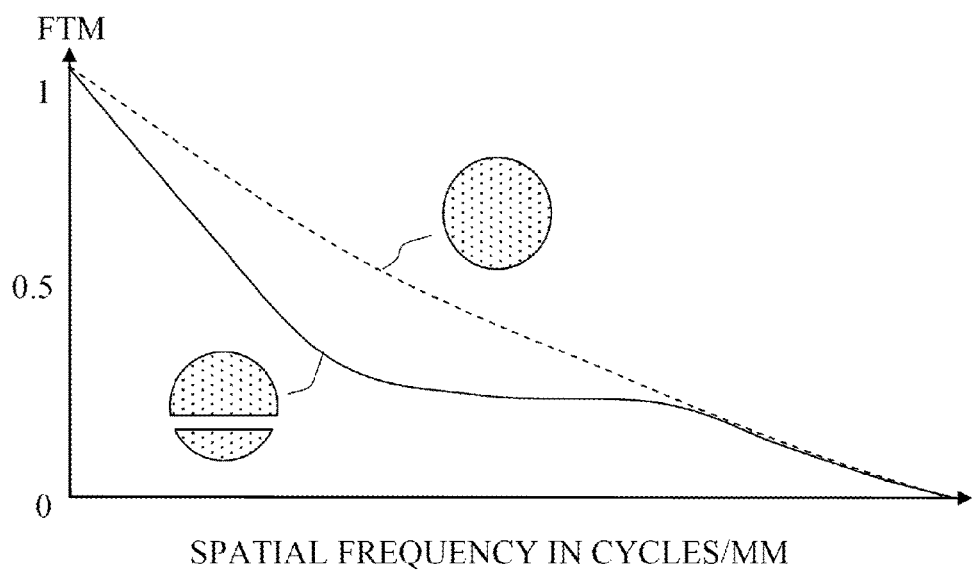
FIG. 4 represents the modulation transfer function of the Korsch telescope with central aperture.
Figure 5:
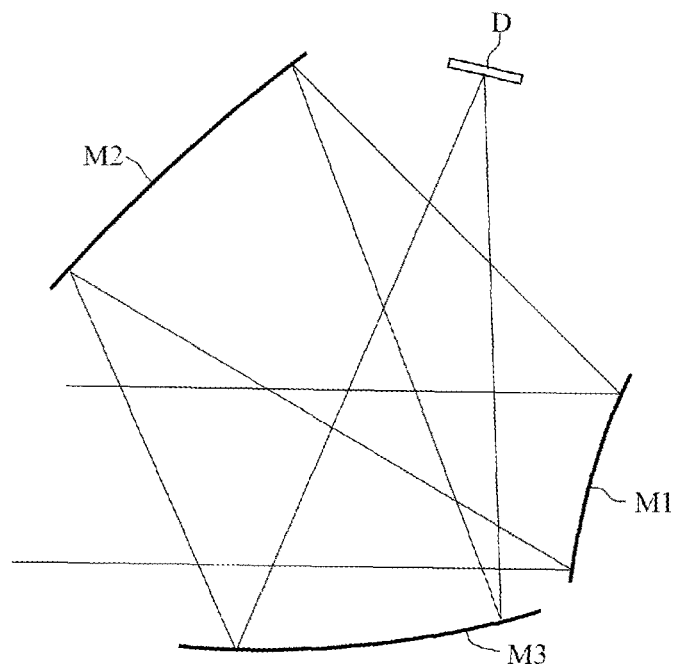
FIG. 5 represents a third optical architecture of three-mirror anastigmat telescopes comprising a freeform mirror according to the prior art.
Figure 6:
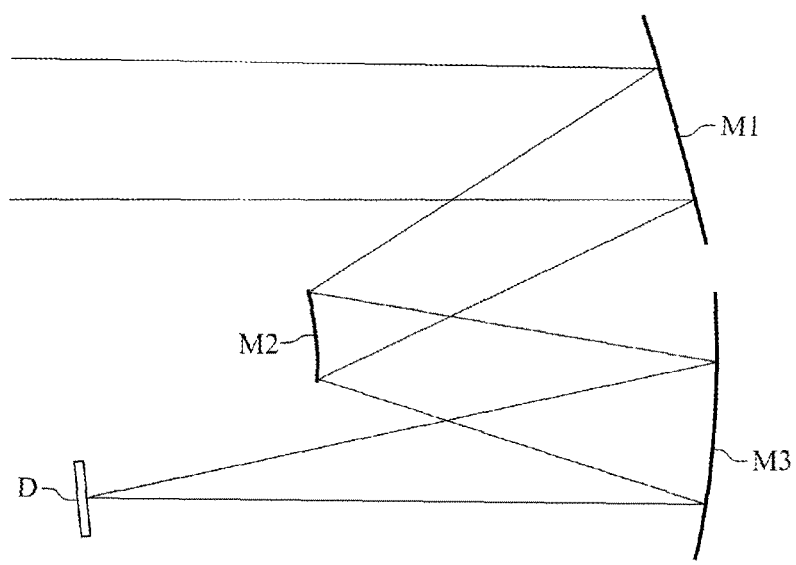
FIG. 6 represents a fourth optical architecture of three-mirror anastigmat telescopes comprising a freeform mirror according to the prior art.

Finally, in a fourth and final step, this occulting is eliminated by a rotation of the mirrors. These rotations allow the optic to continue to work on the optical axis. However, this tilt adds astigmatism and coma. To correct the aberrations added, the form of the freeform mirror or mirrors is modified. By using the nodal aberration theory, it is possible to correct the aberrations created by the rotations of the mirrors, by directly modifying the Zernike polynomials applied to each of the three mirrors. The influence of the Zernike polynomials on the mirrors is different according to the position of the mirror relative to the pupil. Thus, the Zernike polynomials applied to a mirror in the vicinity of the pupil such that the mirror M1 of FIG. 5 have an influence on all the points of the field, which is not the case for the mirror M3 which is situated far from a pupil.

Obviously, the third and the fourth steps can be performed simultaneously.

In a telescope according to the invention, the angular linear field can be greater than 6 degrees in a direction of space or the angular field can be greater than 2.5 degrees in two perpendicular directions of space. The pupil aperture is between 7 and 25.

Also, the absence of aperture in the primary mirror makes it possible to increase the useful surface area by 15 to 20%, to increase the modulation transfer function in the medium frequencies and to simplify the technical production.

By way of example, a Korsch telescope of 10 metre focal length with f/4 aperture can have a linear field of 6°×0.5°. In this case, the root mean square error on the wavefront or RMS WFE, the acronym for "Root Mean Square WaveFront Error" does not exceed $\lambda/24$ in all the field of the telescope.

The invention claimed is:

1. A three-mirror anastigmat telescope comprising a concave first mirror, a convex second mirror and a concave third mirror, the three mirrors being arranged so that the first mirror and the second mirror form, from an object at infinity, an intermediate image situated between the second mirror and the third mirror, the third mirror forming, from this intermediate image, a final image in the focal plane of the telescope, wherein the surface of the concave third mirror is a φ-polynomial surface, a normal to a surface at a center of the concave first mirror being tilted on an optical axis of the telescope defined by the ray passing through a center of an input pupil and perpendicular to the input pupil, a normal to a surface at a center of the convex second mirror being tilted on the optical axis of the telescope and a normal to a surface at a center of the concave third mirror being inclined on the optical axis of the telescope, the pupil of the telescope being situated on the concave first mirror.

2. The anastigmat telescope according to claim 1, wherein the surface of the concave first mirror is a φ-polynomial surface.

3. The anastigmat telescope according to claim 1, wherein the surface of the convex second mirror is a φ-polynomial surface.

4. The anastigmat telescope according to claim 1, wherein the angular field of view is greater than 6 degrees in a direction of space.

5. The anastigmat telescope according to claim 1, wherein the angular field is greater than 2.5 degrees in two perpendicular directions of space.

6. A method for installing a three-mirror anastigmat telescope comprising a concave first mirror, a convex second mirror and a concave third mirror, the three mirrors being arranged so that the first mirror and the second mirror form, from an object at infinity, an intermediate image situated between the second mirror and the third mirror, the third mirror forming from this intermediate image a final image in the focal plane of the telescope, the pupil of the telescope being situated on the concave first mirror, the method being implemented by optical system computation software, wherein the method comprises at least the following steps:
  in a first step, determination of the paraxial parameters of the telescope;
  in a second step, installation of the optical system of the telescope in a Korsch-type configuration comprising the three aspherical mirrors, determination of the main field aberrations by the nodal aberration theory and determination of the corresponding Root Mean Square (RMS) Wave Front Error (WFE);
  in a third step, addition, to the definition of the aspherical surface of one of the mirrors of the optical system, of the Zernike polynomial coefficients corresponding to the computed aberrations, said surface thus being a φ-polynomial freeform surface;
  in a fourth step, elimination of the occluding of the primary mirror by a rotation of at least one of the mirrors and modification of the form of the mirror with freeform surface, so as to correct the aberrations created by the rotation of the mirror and modification of the Zernike polynomials so as to reduce the RMS WFE below a predetermined threshold.

7. The method for installing an anastigmat telescope according to claim 6, wherein the surface definition modifications made in the third step or in the fourth step also affect the surface of one of the other two mirrors of the telescope.

* * * * *